(12) United States Patent
Foreman et al.

(10) Patent No.: US 9,501,609 B1
(45) Date of Patent: Nov. 22, 2016

(54) SELECTION OF CORNERS AND/OR MARGINS USING STATISTICAL STATIC TIMING ANALYSIS OF AN INTEGRATED CIRCUIT

(71) Applicant: INTERNATIONAL BUSINESS MACHINES CORPORATION, Armonk, NY (US)

(72) Inventors: Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shurma, Underhill, VT (US); Alexander J. Suess, Hopewell Junction, NY (US); Natesan Venkateswaran, Croton-on-Hudson, NY (US); Chandramouli Visweswariah, Croton-On-Hudson, NY (US); Vladimir Zolotov, Putnam Valley, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/957,128

(22) Filed: Dec. 2, 2015

(51) Int. Cl.
*G06F 17/50* (2006.01)

(52) U.S. Cl.
CPC ....... *G06F 17/5081* (2013.01); *G06F 17/5031* (2013.01); *G06F 2217/84* (2013.01)

(58) Field of Classification Search
CPC ........... G06F 17/5031; G06F 17/5081; G06F 2217/84
USPC .............................. 716/113, 108, 134; 703/16
See application file for complete search history.

(56) References Cited

U.S. PATENT DOCUMENTS 5,336,939 A * 8/1994 Eitrheim .................... G06F 1/10 327/114
5,359,232 A * 10/1994 Eitrheim .................... G06F 1/10 327/116

(Continued)

FOREIGN PATENT DOCUMENTS

| JP | 2006031141 A | * | 2/2006 |
| JP | 2007257342 A | * | 10/2007 |
| JP | 2009252140 A | * | 10/2009 |

OTHER PUBLICATIONS

Hsu et al., "Clock Gating Optimization with Delay-Matching", Design, Automation & Test in Europe Conference & Exhibition, Mar. 14-18, 2011, pp. 1-6.*

(Continued)

*Primary Examiner* — Phallaka Kik
(74) *Attorney, Agent, or Firm* — Cantor Colburn LLP; Bryan Bortnick (57) ABSTRACT

Examples of techniques for statistical static timing analysis of an integrated circuit are disclosed. In one example according to aspects of the present disclosure, a computer-implemented method is provided. The method comprises performing an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters. The method further comprises determining at least one worst timing corner from the parameterized model for each of the plurality of paths based on the initial statistical static timing analysis and calculated timing value for each of the plurality of paths. The method also comprises performing a subsequent analysis of the integrated circuit using the at least one worst timing corner.

15 Claims, 5 Drawing Sheets

(56) References Cited

U.S. PATENT DOCUMENTS

| | | | |
|---|---|---|---|
| 7,089,143 B2* | 8/2006 | Foreman | G01R 31/3016 702/125 |
| 7,212,946 B1* | 5/2007 | Venkateswaran | G06F 17/5031 702/179 |
| 7,689,957 B2 | 3/2010 | Shenoy | |
| 8,122,409 B2 | 2/2012 | Lackey | |
| 8,141,012 B2 | 3/2012 | Buck et al. | |
| 8,245,167 B1* | 8/2012 | e Silva | G06F 17/5031 716/108 |
| 8,413,095 B1* | 4/2013 | Dubuque | G06F 17/504 716/108 |
| 8,490,045 B2 | 7/2013 | Lackey | |
| 8,504,971 B2 | 8/2013 | Lackey et al. | |
| 8,555,222 B2 | 10/2013 | Le et al. | |
| 8,560,994 B1 | 10/2013 | Agrawal et al. | |
| 8,589,843 B2 | 11/2013 | Lackey et al. | |
| 8,645,881 B1* | 2/2014 | Kriplani | G06F 17/5031 703/19 |
| 8,683,409 B2 | 3/2014 | Hemmett et al. | |
| 8,843,864 B2 | 9/2014 | Le et al. | |
| 2002/0022949 A1* | 2/2002 | Yonezawa | G01R 31/318342 703/14 |
| 2004/0025123 A1* | 2/2004 | Angilivelil | G01R 31/3016 700/109 |
| 2005/0066297 A1* | 3/2005 | Kalafala | G06F 17/5031 716/108 |
| 2005/0081175 A1* | 4/2005 | Scott | G06F 17/505 716/113 |
| 2006/0044932 A1* | 3/2006 | Arp | G01R 31/31723 365/63 |
| 2006/0090150 A1* | 4/2006 | Kucukcakar | G06F 17/5031 716/113 |
| 2007/0156367 A1* | 7/2007 | Kucukcakar | G01R 31/2894 702/123 |
| 2007/0226671 A1* | 9/2007 | Hirata | G06F 17/5031 716/108 |
| 2008/0209373 A1* | 8/2008 | Buck | G06F 17/5031 716/134 |
| 2008/0209374 A1* | 8/2008 | Buck | G06F 17/5031 716/113 |
| 2008/0209375 A1* | 8/2008 | Buck | G06F 17/5031 716/113 |
| 2009/0164677 A1* | 6/2009 | Ware | G06F 13/4243 710/104 |
| 2009/0222780 A1* | 9/2009 | Smith | G06F 17/505 716/113 |
| 2009/0288051 A1* | 11/2009 | Hemmett | G06F 17/5031 716/113 |
| 2010/0250187 A1* | 9/2010 | Zuber | G06F 17/5036 702/179 |
| 2011/0035714 A1* | 2/2011 | Foreman | G06F 17/5031 716/108 |
| 2011/0055793 A1* | 3/2011 | Buck | G06F 17/5031 716/136 |
| 2011/0140745 A1* | 6/2011 | Buck | H03L 7/08 327/156 |
| 2012/0072880 A1* | 3/2012 | Le | G06F 17/5031 716/113 |
| 2012/0102448 A1* | 4/2012 | Haugestuen | G06F 17/5036 716/134 |
| 2013/0018617 A1* | 1/2013 | Buck | G06F 17/5036 702/81 |
| 2013/0031523 A1* | 1/2013 | Foreman | G06F 17/5031 716/113 |
| 2014/0149956 A1* | 5/2014 | Fluhr | G06F 17/5031 716/113 |
| 2016/0072491 A1* | 3/2016 | Bowman | H03K 5/13 327/276 |

OTHER PUBLICATIONS

Roy et al., "Clock Tree Resynthesis for Multi-Corner Multi-Mode Timing Closure", IEEE Transactions on Computer-Aided Design of Integrated Circuits and Systems, vol. 34, No. 4, Apr. 2015, pp. 589-602.*

Feng et al. "SICE: Design-Dependent Statistical Interconnect Corner Extraction Under Inter/Intra-Die", IET Circuits Devices Syst., 2009, vol. 3, Iss. 5, pp. 248-258.

Onaissi et al. "A Fast Approach for Static Timing Analysis Covering All PVT Corners", DC2011, June pp. 5-10, 2011.

* cited by examiner

SELECTION OF CORNERS AND/OR MARGINS USING STATISTICAL STATIC TIMING ANALYSIS OF AN INTEGRATED CIRCUIT

BACKGROUND

The present disclosure relates to techniques for integrated circuit design and fabrication and, more particularly, to techniques for performing statistical static timing analysis of an integrated circuit.

One form of performance analysis used during integrated circuit (IC) design is static timing analysis (STA). STA is an important process by which one identifies any circuit races/hazards which could cause a chip to malfunction, verifies the operational speed of a chip, and identifies the paths which limit the operational speed. STA typically operates on a timing graph, in which nodes represent electrical nodes (e.g., circuit pins) at which signals may make transitions at various times, and edges, or segments, representing the delays of the circuits and/or wires connecting the nodes. Although it may report performance-limiting paths, typical STA methods do not actually operate on paths (of which there may be an exponentially large number), and instead use a "block-based" approach to compute and propagate forward signal arrival times reflecting the earliest and/or latest possible times that signal transitions can occur at nodes in the timing graph. As a result, STA is efficient, allowing for rapid estimation of IC timing on very large designs as compared to other approaches (e.g., transient simulation).

SUMMARY

In accordance with aspects of the present disclosure, a computer-implemented method for a statistical static timing analysis of an integrated circuit is provided. The method comprises performing, by a processor, an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters. The method further comprises determining, by the processor, at least one worst timing corner from the parameterized model for each of the plurality of paths based on the initial statistical static timing analysis and calculated timing value for each of the plurality of paths. The method also comprises performing, by the processor, a subsequent analysis of the integrated circuit using the at least one worst timing corner.

In accordance with additional aspects of the present disclosure, a system for statistical static timing analysis of an integrated circuit is disclosed. The system comprises a processor in communication with one or more types of memory. The processor is configured to perform an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters. The processor is further configured to determine at least one worst timing corner from the parameterized model for each of the plurality of paths based on the initial statistical static timing analysis and calculated timing value for each of the plurality of paths. The processor is also configured to perform a subsequent analysis of the integrated circuit using the at least one worst timing corner.

In accordance with yet additional aspects of the present disclosure, a computer program product for statistical static timing analysis of an integrated circuit is provided. The computer program product comprises a non-transitory storage medium readable by a processing circuit and storing instructions for execution by the processing circuit for performing a method. The method comprises performing an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters. The method further comprises determining at least one worst timing corner from the parameterized model for each of the plurality of paths based on the initial statistical static timing analysis and calculated timing value for each of the plurality of paths. The method also comprises performing a subsequent analysis of the integrated circuit using the at least one worst timing corner.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

In accordance with aspects of the present disclosure, techniques including systems, methods, and/or computer program products for statistical static timing analysis of an integrated circuit are provided. The selection of deterministic timing corners for multi-corner, multi-mode (MCMM) static timing analysis and/or optimization are currently performed by inspection, heuristics, and/or "rule of thumb" techniques. However, these techniques include inherent risks as actual hardware response may not be accurately modeled.

It is known that statistical static timing analysis (SSTA) may improve coverage and lower the risk of not accurately modeling the circuit hardware. However, SSTA is expensive in terms of turn-around time and processing system memory use. For example, SSTA may take days to model a particular IC design. Therefore, IC designers may still use deterministic timing for non-signoff STA and/or optimization even when SSTA is used for signoff of the final IC design. However, this approach may introduce mis-correlation between the timing signoff and non-signoff timing and/or optimization environments. Some IC designers apply MCMM for timing signoff, but this approach retains the inherent risks of not accurately modeling the actual hardware.

For advanced IC designs, the proliferation of sources of variation, and the inter-dependencies among them, is increasing. For example, the following may complicate existing approaches to IC design modeling: the difficulty of effective timing corner selection using existing methods; the number of timing corners required to cover the design space; the criticality of balancing the number of timing corners analyzed and associated margins; and the likelihood of additional design flow iterations, as well as hardware escapes.

In some implementations, the present techniques increase efficiency of optimal timing corner selection using SSTA, enabling reduced turn-around time and memory use of the processing system performing deterministic non-signoff STA and/or non-SSTA-based optimization. In addition, the present techniques provide more accurate and reliable modeling of IC designs by providing accurate and efficient identification of critical timing corners. The present techniques also improve correlation between deterministic non-signoff STA and/or non-SSTA-based optimization and SSTA signoff. Additionally, the present techniques enable iterative updates to timing corner selection as the IC design progresses. These and other advantages will be apparent from the description that follows.

Figure 1:
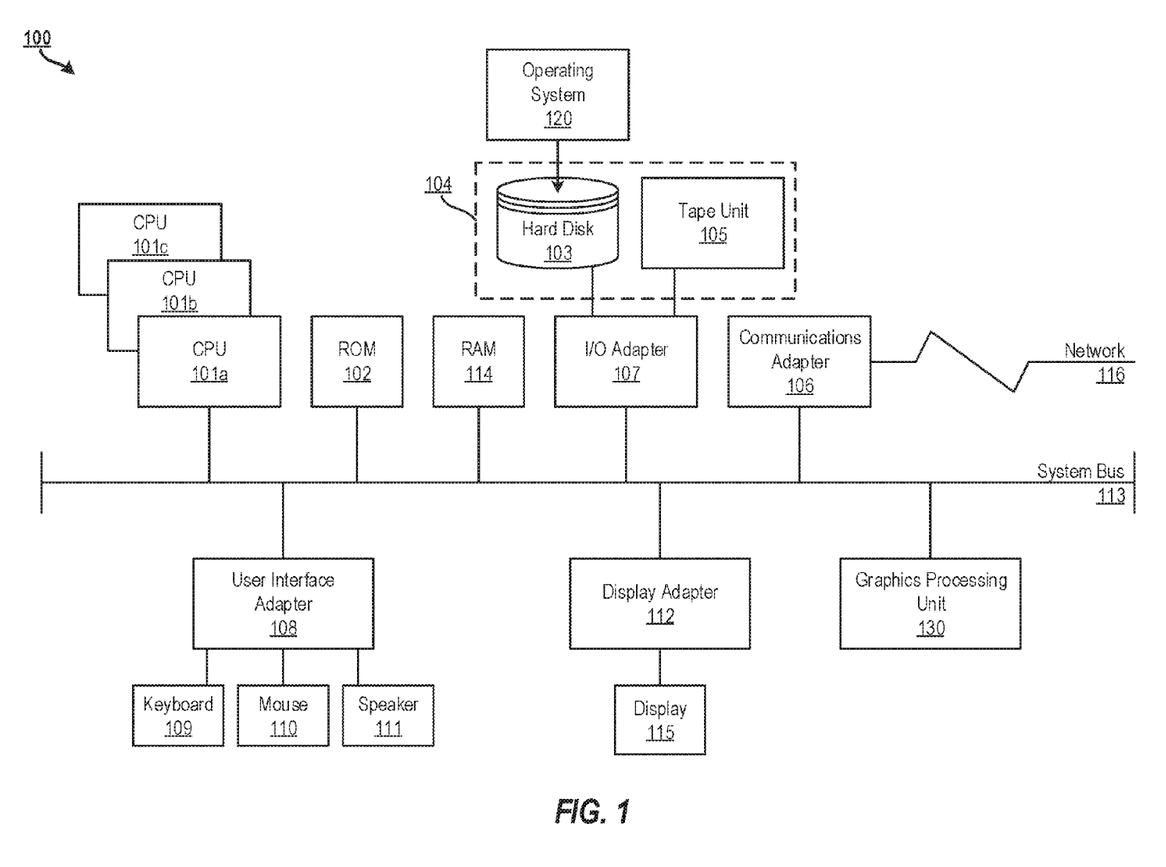
FIG. 1 illustrates a block diagram of a processing system for implementing the techniques described herein according to aspects of the present disclosure.

FIG. 1 illustrates a block diagram of a processing system 100 for implementing the techniques described herein according to aspects of the present disclosure. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM)) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
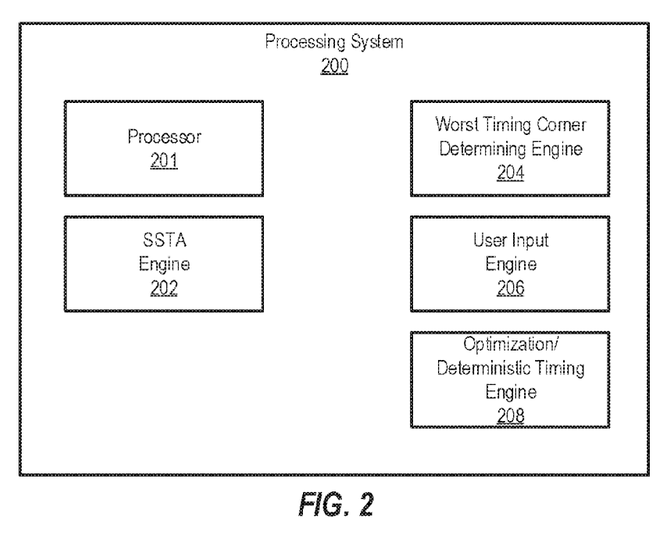
FIG. 2 illustrates a block diagram of a processing system for statistical static timing analysis of an integrated circuit according to aspects of the present disclosure.

FIG. 2 illustrates a block diagram of a processing system 200 for statistical static timing analysis of an integrated circuit according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processor 201 implements the engines described herein. Other engines may also be utilized to include other features and functionality described in other examples herein.

In the example of FIG. 2, the processing system 200 comprises a processor 201, a statistical static timing analysis (SSTA) engine 202, a worst timing corner determining engine 204, and a user input engine 206. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

SSTA engine 202 performs a statistical static timing analysis of an integrated circuit (i.e., an integrated circuit design) to create a parameterized model of the integrated circuit for a plurality of paths on the IC using a plurality of timing corners. The timing corners represent a set of timing performance parameters, which, for example, may include temperature, voltage, process, and the like. A timing slack is calculated for each of the paths. In this way, SSTA engine 202 identifies a set of timing performance parameter values (i.e., a "timing corner"), which leads to a "worst" timing slack for each of the paths in a design of an integrated circuit by projecting a parameterized model for the timing slack to its lowest value. Although the present disclosure references timing slack calculations, other examples of timing quantities may be applied, which include gate or wire delay, path delay, arrival time, required arrival time, slew, guard time, assertion, and/or adjust. Examples of parameterized models include a canonical slack model, a canonical slew model, a canonical arrival time model, etc. The "worst" slack, as used herein, may refer to the lowest value for the slack (i.e., the most negative value for slack).

SSTA engine 202 indicates which timing corner(s) of a plurality of timing corners could be used by deterministic timing tools for optimal coverage and/or by optimization tools in efficient, deterministic, iterative operations to provide a desired correlation to SSTA-based signoff timing of the IC design. For example, for a given number of timing corners, SSTA engine 202 defines the minimum margin needed to meet a desired coverage to include the timing corners. This aspect corresponds to the method 300 illustrated in FIG. 3 and discussed below.

SSTA engine 202 may also indicate a margin to be applied such that timing corner 'n' also covers timing corners 'n+1, n+2, ...' by analyzing slack differences between and among the timing corners. In this way, multiple timing corners may be captured within the margin. For example, for a given margin, SSTA engine 202 identifies the timing corners needed to meet a desired coverage. This aspect corresponds to the method 400 illustrated in FIG. 4 and discussed below.

Worst timing corner determining engine 204 determines a worst timing corner from the plurality of timing corners of the parameterized model for each of the plurality of paths. Worst timing corner determining engine 204 may utilize the initial statistical static timing analysis and the calculated timing slack for each of the paths. A timing corner may represent a set of timing performance parameters such as temperature, voltage, process, and the like. The "worst" timing corner, as used herein, may refer to the timing corner with a set of parameter values returning the worst or lowest value slack. Worst corner determining engine 204 uses the parameterized model to project the worst corner(s) (i.e., the set of timing performance parameters that provide the worst or lowest value slack as projected by the parameterized model).

After the worst timing corner (or, in examples, timing corners) is selected, the worst timing corner(s) may be passed to an optimization/deterministic timing engine 208 to perform optimization and/or deterministic timing operations to optimize the IC setup using the worst timing corner(s). This enables optimization/deterministic timing engine 208 to focus on the worst corner(s), where the most timing fixup work is needed. In additional examples, performing the subsequent deterministic STA and/or optimization operation may also include applying a margin to the at least one worst timing corner and performing the subsequent operation using the margin. This enables the subsequent operation to cover variation around the worst corner. This may be referred to as wrapping a corner with a margin, which also can enable multiple corners to be captured at once. The margin is applied as a change in delay in examples.

In examples, the margin includes not just modeling the base parameters but also modeling variation in process and contingencies for slight variation. For example, the variation in process may include random and systematic on chip variation. The contingencies for slight variation may include voltage droops, for example.

User input engine 206 may receive a user inputs, such as via a keyboard, mouse, touch screen, or other input device. The user inputs may indicate what type of analysis to perform on which paths (e.g., clock versus data, test type, area/region, early/late, etc.). In addition, other user criteria may be received via user input engine 206 which may be utilized to filter slacks based on user criteria (e.g., positive vs. negative, etc.).

Figure 3:
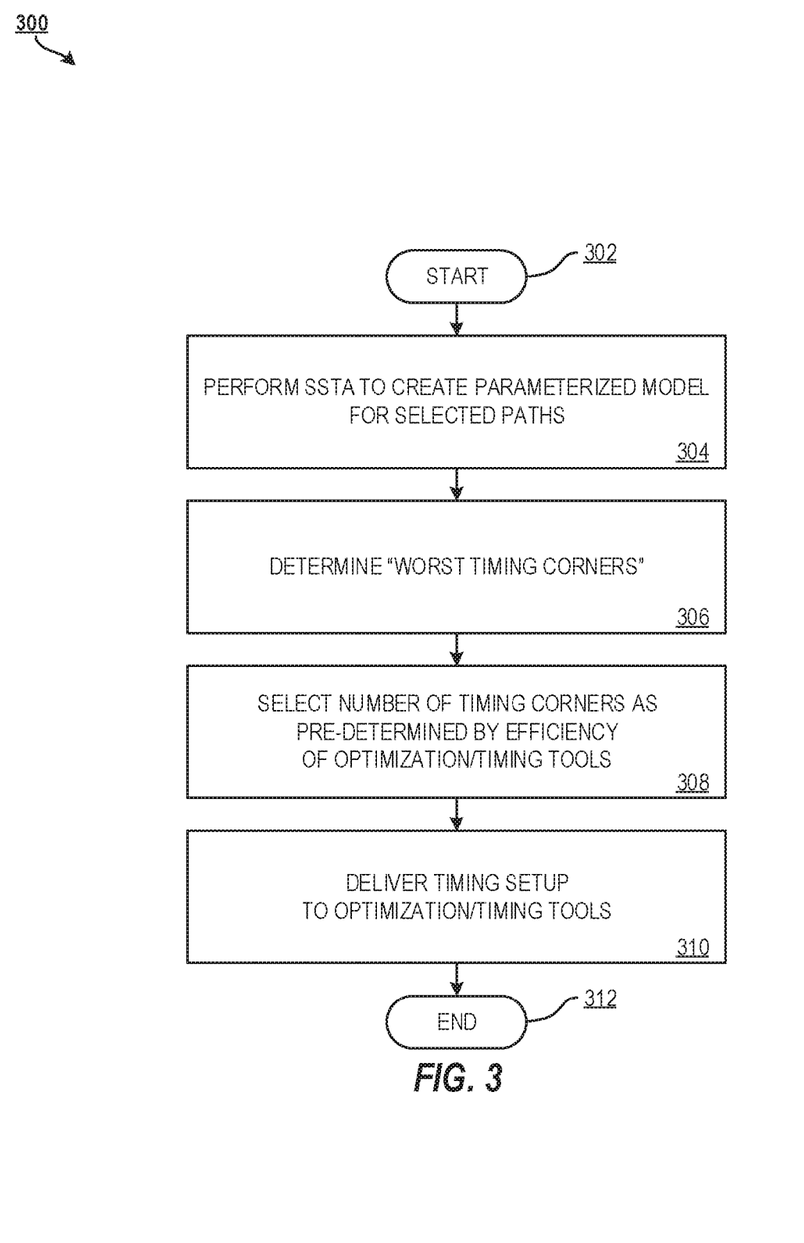
FIG. 3 illustrates a flow diagram of a method for statistical static timing analysis of an integrated circuit according to aspects of the present disclosure.

FIG. 3 illustrates a flow diagram of a method 300 for statistical static timing analysis of an integrated circuit according to aspects of the present disclosure. The method 300 begins at block 302 and continues to block 304.

At block 304, the method 300 includes performing, such as by a processor, an initial statistical static timing analysis of the integrated circuit to create a parameterized model of the integrated circuit for a plurality of paths using a plurality of timing corners to calculate a timing slack for each of the plurality of paths. The plurality of timing corners represents a set of timing performance parameters (e.g., temperature, voltage, process, etc.). The parameterized model may be a canonical slack model, a canonical slew model, a canonical arrival time model, etc.

At block 306, the method 300 includes determining, by the processor, at least one worst timing corner from the parameterized model for each of the plurality of paths based on the initial statistical static timing analysis and calculated timing value (e.g., slack, arrival time, slew, etc.) for each of the plurality of paths.

At block 308, the method 300 includes selecting a number of timing corners for further optimization/deterministic timing testing as pre-determined by the efficiency of optimization and/or timing tools.

At block 310, the method 300 includes delivering a timing setup (e.g., the selected timing corners) to the optimization and/or deterministic timing tools. In examples, this may include performing a subsequent deterministic static timing analysis using the selected at least one worst timing corner. The method 300 continues to block 312 and terminates.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
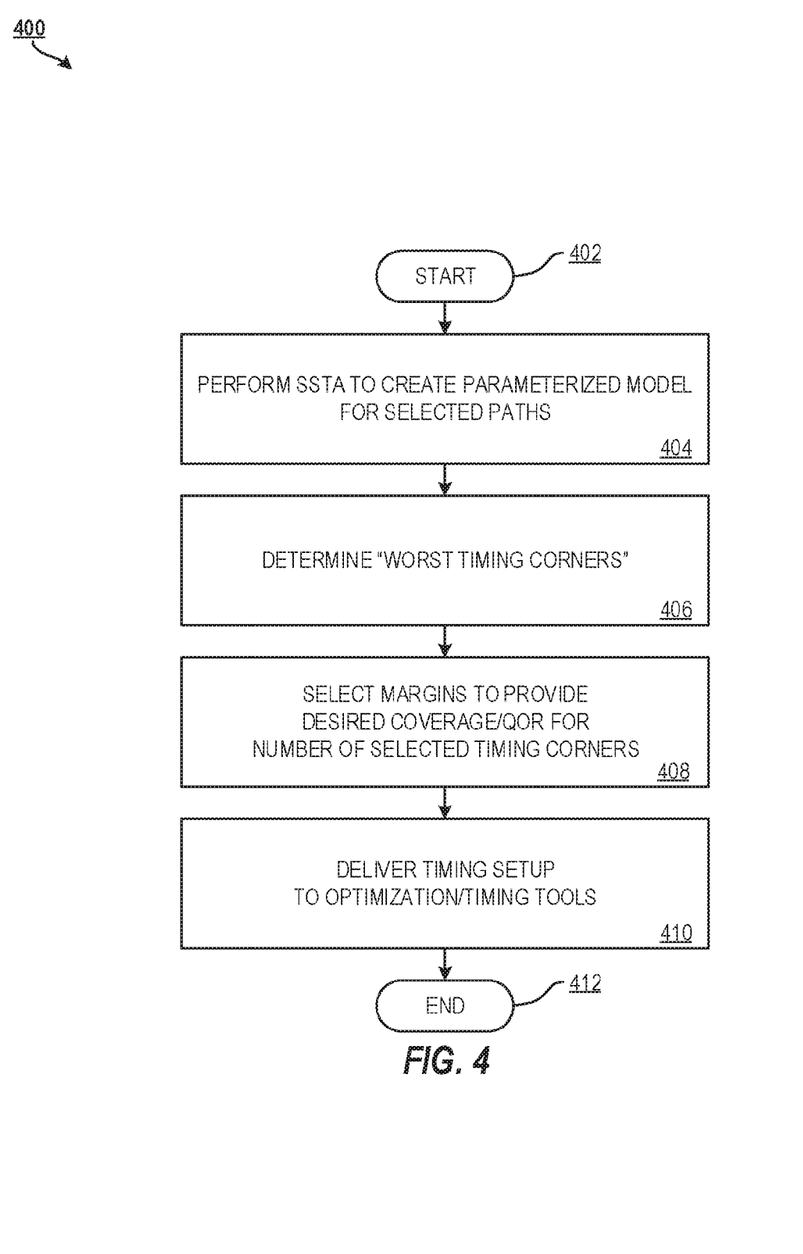
FIG. 4 illustrates a flow diagram of a method for statistical static timing analysis of an integrated circuit according to aspects of the present disclosure.

FIG. 4 illustrates a flow diagram of a method 400 for statistical static timing analysis of an integrated circuit according to aspects of the present disclosure according to examples of the present disclosure. The method 400 begins at block 402 and continues to block 404.

At block 404, the method 400 includes performing, such as by a processor, an initial statistical static timing analysis of the integrated circuit to create a parameterized model of the integrated circuit for a plurality of paths using a plurality of timing corners to calculate a timing slack for each of the plurality of paths. The plurality of timing corners represents a set of timing performance parameters (e.g., temperature, voltage, process, etc.). The parameterized model may be a canonical slack model, a canonical slew model, a canonical arrival time model, etc.

At block 406, the method 400 includes determining, by the processor, at least one worst timing corner from the parameterized model for each of the plurality of paths based on the initial statistical static timing analysis and calculated timing value (e.g., slack, arrival time, slew, etc.) for each of the plurality of paths.

At block 408, the method 400 includes selecting margins to provide a desired coverage or quality of results for a number of selected timing corners. For example, if a group timing corners is selected, margins may be selected to make them more effective (i.e., cover more of the application space, or cover other timing corners).

At block 410, the method 400 includes delivering a timing setup (e.g., the selected timing corners and margins) to the optimization and/or deterministic timing tools. In examples, this may include performing a subsequent statistical static timing analysis using the selected at least one worst timing corner. The method 400 continues to block 412 and terminates.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
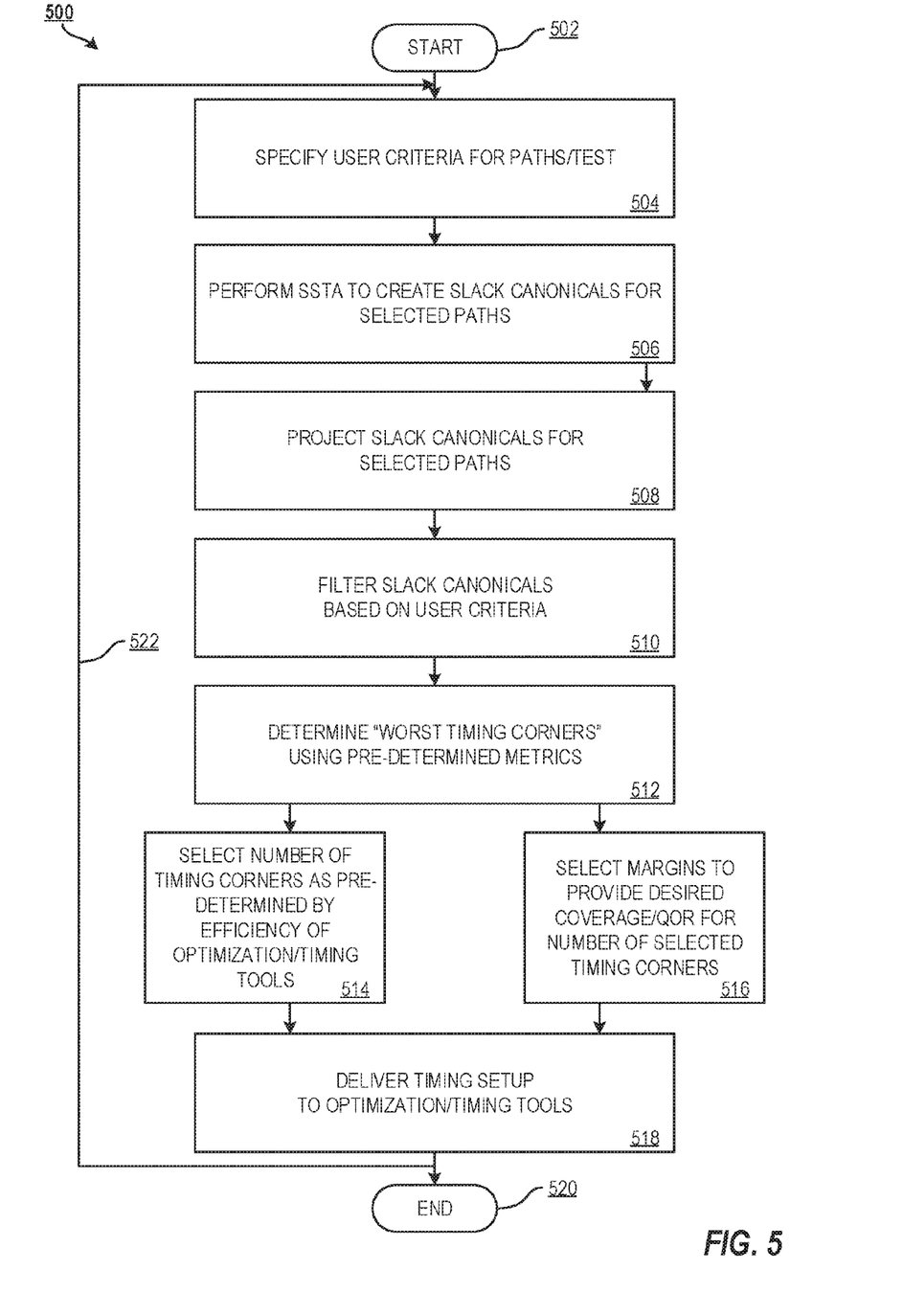
FIG. 5 illustrates a flow diagram of a method for statistical static timing analysis of an integrated circuit according to aspects of the present disclosure.

FIG. 5 illustrates a flow diagram of a method 500 for statistical static timing analysis of an integrated circuit according to aspects of the present disclosure. The method 500 begins at block 502 and continues to block 504.

At block 504, a user may specify criteria for paths and/or tests. For example, a user may specify particular paths to be tested, certain tests to be performed, certain regions of the design to be analyzed, etc.

At block 506, statistical static timing analysis is performed for each of the paths of the IC to create slack canonicals.

At block 508, the slack canonicals for each of the selected paths of the IC are projected to the worst value.

At block 510, user criteria may be applied to filter the slack canonicals. This enables a user to define the "worst value" based on a desired test, outcome, or which parameters are of more or less importance, for example. The user may also specify certain paths to be excluded, such as paths that return a positive slack.

At block 512, the worst timing corners are determined, for example, using pre-determined test metrics. Examples of predetermined test metrics may be whether a setup test is to be applied or whether a hold test is to be applied. In examples, a setup test enables determining whether a delay is too long while a hold tests enables determining whether data is captured in the correct clock cycle. Which of the timing corners are considered "worst" may vary depending on which type of test is being applied. The determination of the worst corners(s) may be done by techniques familiar to a person having ordinary skill in the art.

After the worst timing corners are determined at block 512, one of two options may be implemented. It should be understood that one of block 514 and block 516 is implemented at a time. In one example, at block 514, a number of timing corners are selected as determined by the efficiency of the optimization/deterministic timing tool. For example, four timing corners may be selected for an optimization/deterministic timing tool with a four corner maximum. However, other numbers of corners may be selected depending on the efficiency of the optimization/deterministic timing tool.

In another example, at block 516 a margin is selected to provide a desired coverage for a number of selected timing corners. For example, if four timing corners are selected, the margins to make them effective are selected. In examples, a desired quality of result (e.g., a measure of how close to a particular answer is desired) for the number of selected corners may be implemented.

At block 518, the corner and/or margin timing setup information from blocks 514 and 516 respectively is delivered to an optimization/timing tool. The method then proceeds to block 520 and ends. However, in other examples, the method 500 may be iterative, as illustrated by arrow 522 to enable iteration as the IC design matures.

Although FIG. 5 is discussed with reference to "slack" timing, it should be appreciated that other timing values of interest, such as arrival time, slew, etc. may be implemented instead and/or in addition to slack. Additional processes also may be included, and it should be understood that the processes depicted in FIG. 5 represent illustrations, and that other processes may be added or existing processes may be removed, modified, or rearranged without departing from the scope and spirit of the present disclosure.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for statistical static timing analysis of an integrated circuit, the method comprising:
    performing, by a processor, an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters;
    determining, by the processor, at least one worst timing corner from the parameterized model for each of the plurality of paths based on the initial statistical static timing analysis and calculated timing value for each of the plurality of paths;
    calculating a margin for each of the at least one worst timing corners; and
    performing, by the processor, a subsequent analysis of the integrated circuit using the at least one worst timing corner,
    wherein performing the subsequent analysis further comprises applying the margin to the at least one worst timing corner and performing the subsequent analysis using the margin, wherein the subsequent analysis is one of an optimization analysis and a deterministic timing analysis.

2. The computer-implemented method of claim 1, further comprising selecting the plurality of paths based on a first user criteria received from a user.

3. The computer-implemented method of claim 2, further comprising filtering the timing values for each of the plurality of paths based on a second user criteria received from the user.

4. The computer-implemented method of claim 1, wherein the parameterized model is a canonical slack model and the timing value is a slack.

5. The computer-implemented method of claim 1, wherein the parameterized model is a canonical slew model and the timing value is a slew.

6. The computer-implemented method of claim 1, wherein the parameterized model is a canonical arrival time model and the timing value is an arrival time.

7. The computer-implemented method of claim 1, wherein the set of timing performance parameters comprises a temperature value, a voltage value, and a process value.

8. A system for statistical static timing analysis of an integrated circuit, the system comprising:
    a processor in communication with one or more types of memory, the processor configured to:
        perform an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters,
        determine at least one worst timing corner from the parameterized model for each of the plurality of paths based on the initial statistical static timing analysis and calculated timing value for each of the plurality of paths,
calculate a margin for each of the at least one worst timing corners; and
perform a subsequent analysis of the integrated circuit using the at least one worst timing corner,
wherein performing the subsequent analysis further comprises applying the margin to the at least one worst timing corner and performing the subsequent analysis using the margin, wherein the subsequent analysis is one of an optimization analysis and a deterministic timing analysis.

9. The system of claim 8, wherein the processor is further configured to select the plurality of paths based on a first user criteria received from a user.

10. The system of claim 9, wherein the processor is further configured to filter the timing values for each of the plurality of paths based on a second user criteria received from the user.

11. The system of claim 8, wherein the parameterized model is a canonical slack model and the timing value is a slack.

12. The system of claim 8, wherein the parameterized model is a canonical slew model and the timing value is a slew.

13. The system of claim 8, wherein the parameterized model is a canonical arrival time model and the timing value is an arrival time.

14. The system of claim 8, wherein the set of timing performance parameters comprises a temperature value, a voltage value, and a process value.

15. A computer program product for statistical static timing analysis of an integrated circuit, the computer program product comprising:
a non-transitory storage medium readable by a processing circuit and storing instructions for execution by the processing circuit for performing a method comprising:
performing an initial statistical static timing analysis of the integrated circuit to create a parameterized model of the integrated circuit for a plurality of paths using a plurality of timing corners to calculate a timing value for each of the plurality of paths, each of the plurality of timing corners representing a set of timing performance parameters,
determining at least one worst timing corner from the parameterized model for each of the plurality of paths based on the initial statistical static timing analysis and calculated timing value for each of the plurality of paths,
calculating a margin for each of the at least one worst timing corners; and
performing a subsequent analysis of the integrated circuit using the at least one worst timing corner,
wherein performing the subsequent analysis further comprises applying the margin to the at least one worst timing corner and performing the subsequent analysis using the margin, wherein the subsequent analysis is one of an optimization analysis and a deterministic timing analysis.

* * * * *

UNITED STATES PATENT AND TRADEMARK OFFICE
CERTIFICATE OF CORRECTION

PATENT NO. : 9,501,609 B1  
APPLICATION NO. : 14/957128  
DATED : November 22, 2016  
INVENTOR(S) : Eric A. Foreman et al.

Page 1 of 1

It is certified that error appears in the above-identified patent and that said Letters Patent is hereby corrected as shown below:

On the Title Page

Item (72) should read:  
(72) Inventor: Stephen G. Shuma, Underhill, VT (US)

Signed and Sealed this  
Twenty-first Day of July, 2020

Andrei Iancu  
*Director of the United States Patent and Trademark Office*